United States Patent [19]

Denaldi et al.

[11] 4,240,305
[45] Dec. 23, 1980

[54] RETAINING CLAMP FOR AN ADJUSTABLE STEERING COLUMN

[75] Inventors: Ermanno Denaldi, Turin; Gian P. Rolfo, Grugliasco, both of Italy

[73] Assignee: Fiat Veicoli Industriali S.p.A., Turin, Italy

[21] Appl. No.: 959,133

[22] Filed: Nov. 9, 1978

[30] Foreign Application Priority Data

Nov. 9, 1977 [IT] Italy .................. 69506 A/77

[51] Int. Cl.³ .............................................. B62D 1/22
[52] U.S. Cl. ........................................ 74/493; 74/531; 403/59
[58] Field of Search .................. 74/493, 531; 403/55, 403/59, 61, 373

[56] References Cited

U.S. PATENT DOCUMENTS

| | | | |
|---|---|---|---|
| 566,360 | 8/1896 | White | 403/61 |
| 597,342 | 1/1898 | Webb | 403/59 |
| 1,511,630 | 10/1924 | Ozlek | 403/59 |
| 2,802,633 | 8/1957 | Moore | 403/55 |
| 3,412,629 | 11/1968 | Hill | 74/493 |

*Primary Examiner*—Peter M. Caun

*Attorney, Agent, or Firm*—Sughrue, Rothwell, Mion, Zinn & Macpeak

[57] ABSTRACT

A retaining clamp for an adjustable steering column of a motor vehicle comprises a bracket for mounting beneath the vehicle instrument panel, and a resilient seat member defining a seat for the column having two spaced apart arms extending towards the bracket and engaged between two bracket plates, the arms being tubular and formed with coaxial frusto-conical surfaces about an axis perpendicular to the steering column axis, each surface being engaged with a cooperating frusto-conical surface associated with a respective bracket plate. A screw-threaded clamping shaft extends axially of the frusto-conical surfaces, and is engaged at one end by a manually rotatable knob such that rotation of the knob to tighten the clamp wedges the cooperating frusto-conical surfaces together to clamp the seat member to the bracket and presses the arms together to clamp the steering column in the seat, unclamping of the clamp allowing the steering column to be moved axially in the seat or pivoted with the seat member about the clamp shaft, the frusto-conical surfaces acting as bearing surfaces.

9 Claims, 6 Drawing Figures

RETAINING CLAMP FOR AN ADJUSTABLE STEERING COLUMN

BACKGROUND OF THE INVENTION

The present invention relates to a retaining clamp for an adjustable steering column of a motor vehicle.

The inclination of the steering column and the height of the steering wheel of a motor vehicle in relation to the driver's seat are generally designed for a person of average size but this arrangement is often uncomfortable and necessitates a sitting position which reduces the vision through the windscreen for persons physically far removed from this average.

In the past, attempts have been made to overcome this disadvantage by providing adjustable seats or adjustable steering columns but the adjustment controls, particularly for steering columns, which are at present in use are either extremely complex or inefficient. In particular, known devices for adjusting the steering column require two controls, one specifically for controlling the axial displacement of the steering column to vary the height of the steering wheel and the other for controlling the angular displacement of the column to adjust its inclination to the driving seat. A further problem is that these controls are not manually operable and require special tools which must first be located in respective seats before adjustment can be carried out. This obviously means that adjustment takes a considerable amount of time and the vehicle must be stationary.

OBJECT OF THE INVENTION

The object of the invention is, therefore, to provide a single control which allows adjustment of the steering column of a motor vehicle by the driver quickly and easily, without the need for special tools or for the driver to leave his seat or interrupt the driving and which is simple and econimical to make.

SUMMARY OF THE INVENTION

According to the present invention there is provided a retaining clamp for an adjustable steering column of a motor vehicle, comprising a bracket adapted to be fixed to a cross member of the vehicle instrument panel and a resilient seat member defining a seat for the steering column and having two arms extending substantially in the same direction transverse the axis of the seat and engaged with the bracket for pivotal movement about an axis transverse the arms and the seat axis and a manually operable screw clamp for clamping the arms to the bracket and for simultaneously clamping the seat member against a steering column, in use, to retain it in the seat, the clamp being manually releasable to allow axial sliding movement of the column relative to the seat member and pivotal movement of the column with the seat member about the pivot axis.

The present invention thus requires the operation of only one control to allow adjustment of the steering column both for inclination and for height. It also allows such rapid adjustment of the steering column position that it is possible to adjust this to different optimum positions for widely varying driving conditions such as, for example, motorway and mountain driving.

The screw clamp preferably has a screw threaded shaft which forms the pivot axis of the seat member.

In preferred embodiments of the invention at least one arm of the seat member is formed with a frusto-conical surface which engages a cooperating frusto-conical surface of the bracket, the surfaces being wedged together on tightening of the clamping screw and acting as bearing surfaces for pivoting of the seat member when the clamp is released. The provision of interengaging frusto-conical surfaces increases the friction between the seat member and the bracket on tightening of the clamping screw compared with, for example, planar engagement surfaces and thus provides firmer and safer clamping to retain the steering column in a desired portion.

Preferably both seat member arms have frusto-conical surfaces which cooperate with respective surfaces of the bracket. These may be clamped one on either side of an arm of the bracket, but in preferred embodiments of the invention the arms are clamped between two plates of the bracket, each arm having a frusto-conical surface which cooperates with a complementary frusto-conical surface associated with a respective adjacent bracket plate.

The frusto-conical surfaces of the bracket may be formed on projecting portions of the plates, the screw threaded clamping shaft extending through respective apertures in the plates and being retained at one end by a head which abuts an outer face of one plate and at the other end by a manually-rotatable knob which is threaded on to the screw-threaded shaft and is adapted to abut a face of the other plate. In this case the plates would be resiliently deformable such that, on rotation of the knob to tighten the clamp, they are deformed towards each other to clamp the arms of the seat member between them.

In alternative embodiments the plates may be substantially rigid, the frusto-conical surfaces being provided on respective members mounted in apertures in the plates and movable towards or away from each other on tightening or loosening of the clamping screw which extends through throughbores in the members, and is retained against respective members in a manner similar to that described above.

On loosening of the clamping screw, axial and pivoting movement of the steering column are preferably limited by respective stops.

BRIEF DESCRIPTION OF THE DRAWINGS

According to a further aspect of the invention there is provided an adjustable steering column retained by a clamp as described above.

Several embodiments of the invention will now be more particularly described, by way of example, with reference to the accompanying drawings, in which.

DESCRIPTION OF THE PREFERRED EMBODIMENTS

Referring to the drawings, similar parts of the clamps of the various embodiments are indicated by the same reference numerals.

Figure 1:
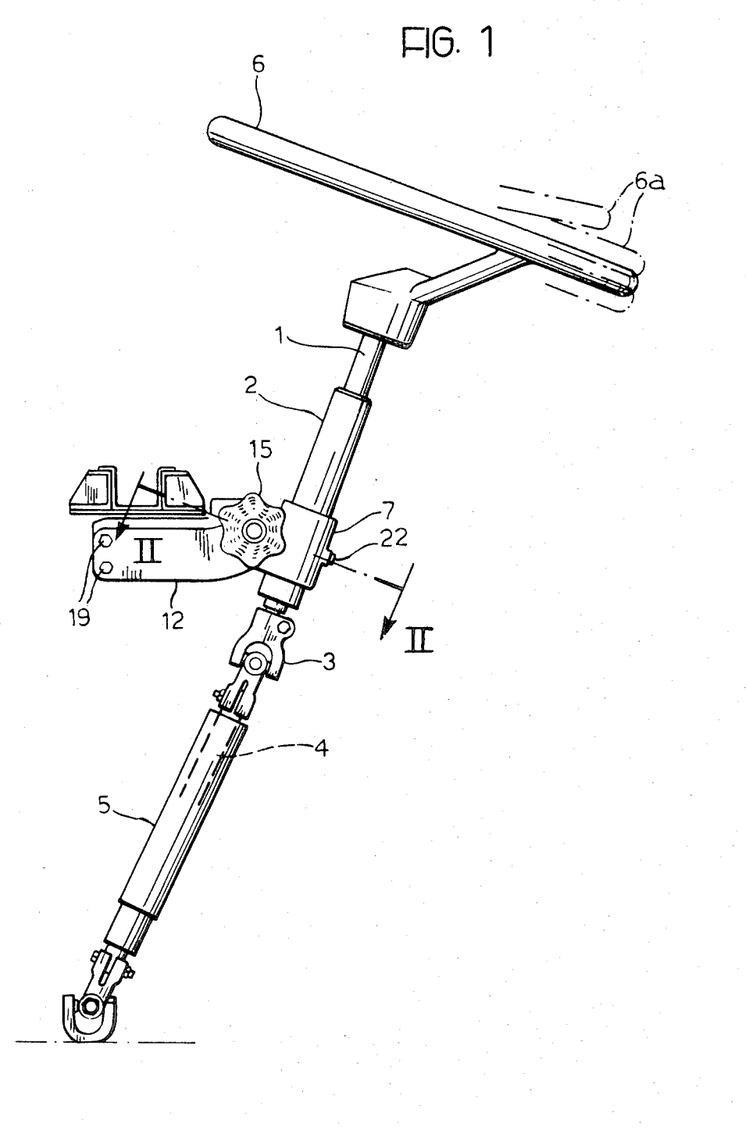
FIG. 1 is a diagrammatic side elevational view of an adjustable steering column of a vehicle fitted with a retaining clamp according to a first embodiment of the invention.

FIG. 1 of the drawings shows the steering column of a motor vehicle having an upper steering rod section 1 housed in a tubular casing 2 and carrying a steering wheel 6 at its upper end. At its lower end, the section 1 is connected by means of a universal joint 3 to a lower steering rod section 4 of the column; the inclination of the upper section 1 is thus variable with respect to the lower section 4 about the joint 3.

The lower section 4 of the column is slidable axially in a tubular sleeve 5 so as to allow variation of the height of the section 1 and hence of the steering wheel 6. The section 4 is constrained against rotation in the sleeve 5 by means of a tongue and groove coupling with the sleeve 5. The sleeve 5 is in turn connected at its lower end to mechanical members of a steering box (not shown) for controlling the orientation of the steerable wheels of the vehicle on rotation of the steering rod by means of the steering wheel 6.

The upper section 1 of the steering column is maintained at a desired inclination to the driving seat (not shown) with the wheel 6 at a desired height by means of a clamp according to the invention, which includes a support bracket generally indicated 12, fixed to a cross member of the vehicle instrument panel by bolts 19.

Figure 2:
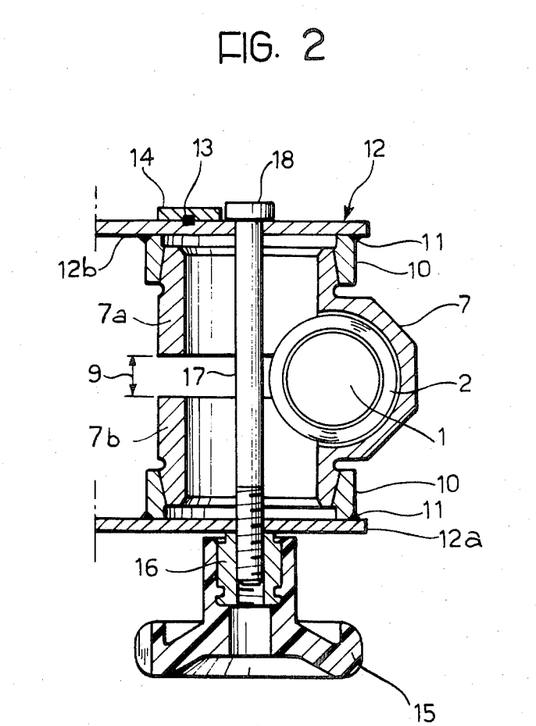
FIG. 2 is a sectional view on an enlarged scale of a clamp similar to that of FIG. 1, taken on a line corresponding to line II—II of FIG. 1.

Referring to FIG. 2 of the drawings, the support bracket 12 has two support plates 12a, 12b which extend parallel to each other towards the steering column. The plates 12a, 12b support between them a resilient seat member 7 which has a part-cylindrical seat which cooperates with the outer cylindrical surface of the casing 2 of the section 1 of the steering column.

The seat member 7 is engaged with the support bracket 12 by means of two arms 7a, 7b, located between the plates 12a, 12b and spaced from each other by a space 9. The arms 7a, 7b are tubular, the axes of the tubes extending substantially perpendicular to the plates 12a, 12b and to the axis of the part-cylindrical seat. The end portion of the tubular wall of each arm 7b, 7a adjacent the respective plate 12a, 12b, has a frusto-conical external surface which cooperates with an inner frusto-conical surface of an annular flange 10 welded to the respective adajcent plate 12a or 12b by a weld 11; the frusto-conical surfaces are so arranged that the said surfaces of the opposing flanges 10 flare outwardly towards each other.

The clamp also includes a partially screw-threaded clamping shaft 17 which extends axially through the tubular arms 7a, 7b and through corresponding apertures in the plates 12a and 12b. The shaft 17 is retained at one end by a head 18, which abuts the outer face of the plate 12b and also abuts a stop 14, welded at 13 to the plate 12b to prevent rotation of the shaft 17 about its longitudinal axis. The opposite end of the shaft 17 which is screw-threaded is engaged in an internally screw-threaded insert 16 of a manually operable knob 15, the free end of the insert 16 abutting the outer face of the plate 12a.

In use of the clamps of FIGS. 1 and 2, rotation of the knob 15 in a clockwise sense as seen in the FIG. 1 screws the insert 16 further on to the shaft 17, drawing the plates 12a and 12b closer together. This in turn presses the arms 7a, 7b together, reducing the gap 9 and clamping the seat member 7 against the casing 2 of the steering column. A simultaneous wedging action of the flanges 10 against the frusto-conical surfaces of the arms 7a, 7b clamps the plates 12a and 12b to the seat member 7.

Rotation of the knob 15 in the anti-clockwise sense, however, unscrews the insert 16 from the shaft 17 releasing the pressure on the plates 12a, 12b and on the arms 7a, 7b, unclamping the seat member from the casing 2. In this unclamped condition, the casing 2 is free to slide axially within the seat in the member 7 and can be pulled upwardly or pushed downwardly by the driver of the vehicle to raise or lower the steering wheel 6 at will. At the same time, the flanges 10 are released from clamping engagement with the arms and the member 7 can be pivoted about the axis of the shaft 17, the frusto-conical surfaces of the flanges 10 acting as bearing surfaces within which the surfaces of the arms are rotatable. The upper section 1 of the steering column can thus be pivoted with the seat member 7 about the shaft 17 relative to the lower section 4 to change the inclination of the section 1.

The driver of the vehicle may thus alter the inclination of the section 1 and the height of the steering wheel 6 as desired, for example to a position shown as 6a in FIG. 1. The driver may then rotate the knob 15 in the clockwise sense to tighten the shaft 17 and clamp the seat member 7 to the casing 2 to prevent axial movement of the section 1 and also pivotal movement about the shaft 17 to retain the column in the desired position.

Figure 4:
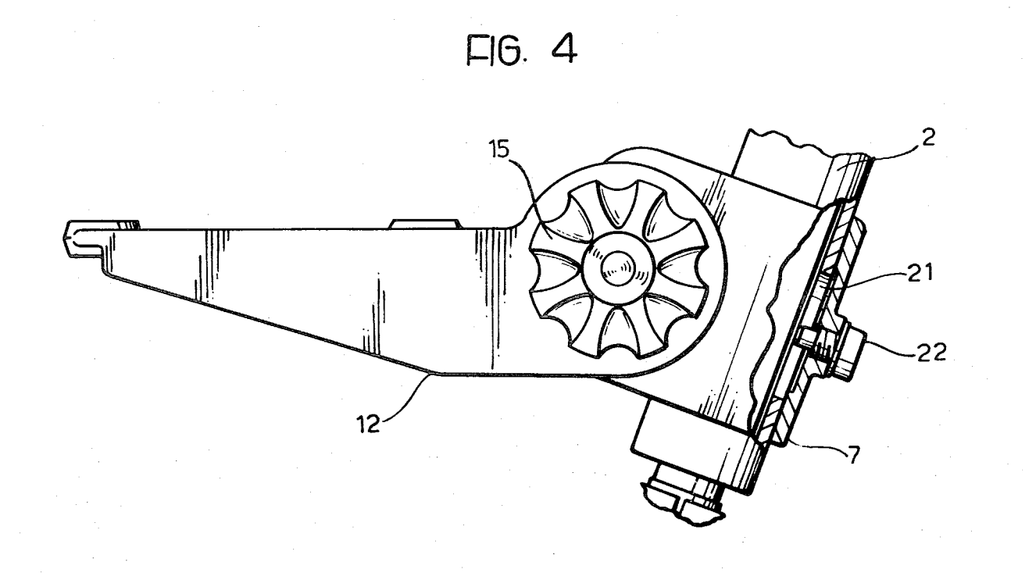
FIG. 4 is a side elevational view of the clamp of FIG. 3.

The axial adjustment of the section 1 is limited by a bolt 22, best shown in FIG. 4, engaged in a screw threaded aperture in the seat member 7 and projecting into a longitudinally-extending slot 21 in the casing 2. Suitable stops, (not shown) on the bracket 12 limit the angular displacement of the column.

Figure 3:
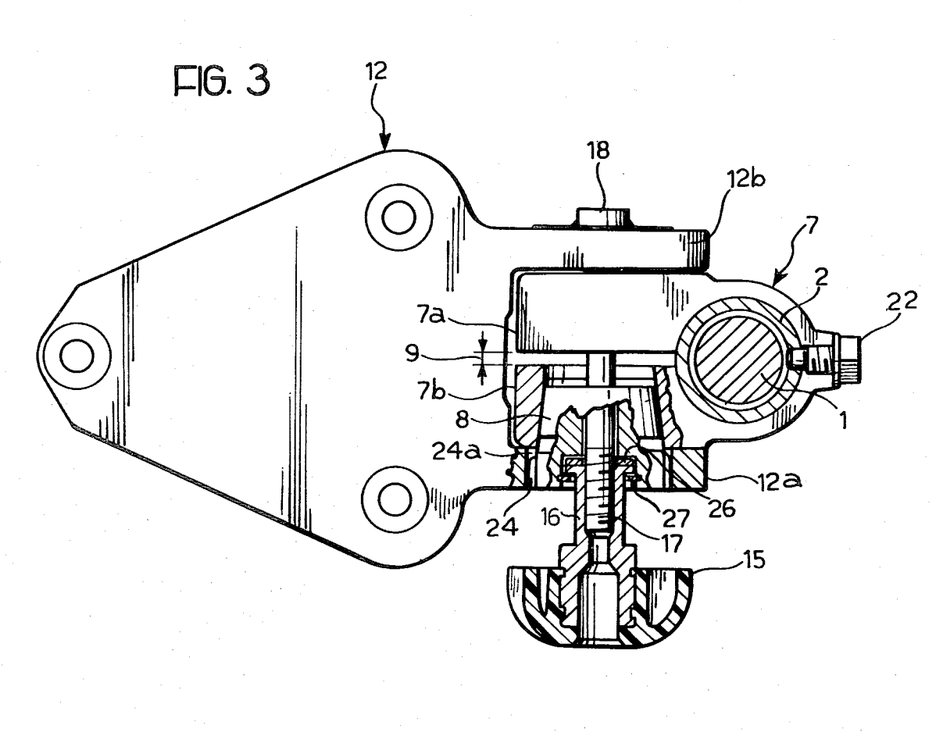
FIG. 3 is a partially cut-away, top plan view of a clamp according to a third embodiment of the invention.

Referring to FIGS. 3 and 4 of the drawings, a third embodiment of the clamp is shown. In this embodiment the tubular arms 7a, 7b are formed with internal frusto-conical surfaces. These surfaces cooperate with respective frusta 8, through which the shaft 17 extends, keyed in respective apertures in the arms 12b and 12a of the bracket 12 by means of axially extending peripheral tongues 24 of cylindrical end portions of the frusta 8 and cooperating grooves 24a of the apertures. The frusta 8 can thus slide axially within the apertures in the bracket arms 12a and 12b to allow the tightening against the frusto-conical surfaces of the arms 7a, 7b, but are constrained against rotation.

The head 18 of the shaft 17 is welded to a frustum 8, a needle bearing 26 being provided between the free end of the insert 16 and the surface of the other frustum 8 against which it bears in order to improve the tightening torque on rotation of the knob 15 in the clockwise sense as described above with reference to FIGS. 1 and 2. A resilient ring or circlip 27, engaged in a groove within the frustum 8, is engageable by an end flange of the insert 16 on rotation of the knob in the anti-clockwise sense, to exert pressure on the frustum 8 away from the other frustum 8 to unclamp the frusta from the arms 7a, 7b and the arms from the steering column casing 2.

Figure 5:
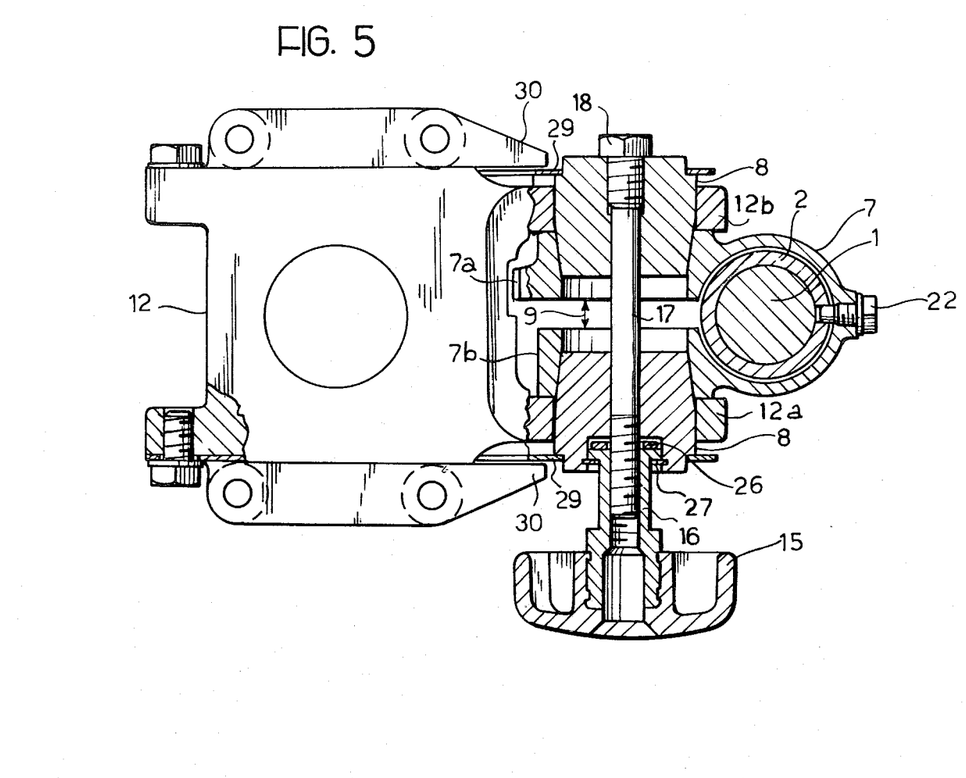
FIG. 5 is a view similar to FIG. 2 of a clamp according to a further embodiment of the invention.
Figure 6:
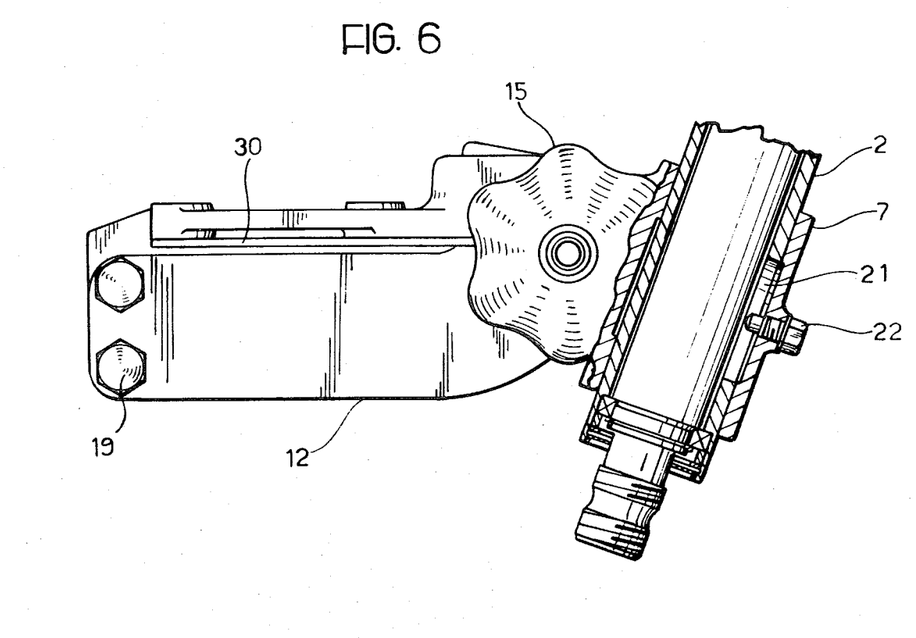
FIG. 6 is a side elevational view similar to FIG. 4 of the embodiment of FIG. 5.

Referring to FIGS. 5 and 6 of the drawings, a further embodiment of the invention is shown in which frusta 8 similar to those of the embodiment of FIGS. 3 and 4, are engaged in arms 12a and 12b of the bracket 12. In this embodiment, however, the frusta 8 are also urged towards each other by two resilient sheet metal plates 29 extending parallel to and outside the arms 12a, 12b, the frusta 8 being fixed in respective apertures, one in each plate 29, the edge of each aperture engaging a shoulder of the corresponding frustum 8. Stops 30 are provided, one on either side of the bracket 12 for preventing separation of the plates 29 and hence of the frusta 8 beyond a desired limit on rotation of the knob 15 in the anticlockwise sense to unclamp the clamp 7.

In this embodiment the shaft 17 is threaded at both ends, the end remote from the knob 15 being engaged in a screw-threaded bore in the corresponding frustum 8 so as further to increase the tightening torque when the insert 16 is screwed clockwise on to the shaft 17.

The clamps described above are operable simply and easily by hand and are so formed that the clamp can be released slightly to allow both the inclination and the height of the upper section 1 of the steering column to be adjusted while retaining the column in the clamp seat and resulting in negligible interference to the steering function of the column. The position of the steering column may thus be adjusted during motion of the vehicle.

A further advantage of the above clamps is that the steering column is retained in each clamp by friction, the clamps being manually tightenable to such an extent as to ensure that the position of the column cannot be changed during normal driving operations. Any excessive force on the column, however, due, for example, to a frontal collision of the vehicle will result in pivoting of the upper section of the column towards the dashboard, reducing potential injury to the driver.

What is claimed is:

1. A retaining clamp for a motor vehicle steering column which is adjustable longitudinally and angularly about a pivot axis transverse its longitudinal axis, wherein said clamp comprises:

a bracket adapted to be fixed to a vehicle body cross member and having means defining said pivot axis of said steering column;

a resilient seat member defining a seat for said steering column having an axis coaxial with said longitudinal axis of said steering column in use, said seat member having two arms extending substantially in the same direction transverse to said seat axis and engaged with said bracket for pivotal movement about said pivot axis; and a manually operable screw clamp for clamping said arms to said bracket and for simultaneously clamping said seat member against said steering column, in use, to retain it in said seat, said clamp being manually releasable to allow axial sliding movement of said steering column relative to said seat member and pivotal movement of said steering column with said seat member about said pivot axis, wherein said screw clamp has a screw-threaded shaft which defines said pivot axis, each of said arms of said seat member is formed with a frusto-conical surface and said bracket has two plates each having a complementary frusto-conical surface engaged with a respective frusto-conical surface on an arm, said arms being clamped between said bracket plates and said frusto-conical surfaces being wedged together on tightening of said clamping screw, said frusto-conical surfaces acting as bearing surfaces for pivoting of said seat member when said clamp is released, each said plate has a projection upon which said complementary frusto-conical surface is formed and which defines an aperture coaxial with said complementary frusto-conical surface;

said screw-threaded shaft extends through said apertures and has a head at one end which abuts an outer face of one of said plates and a manually rotatable knob threaded onto its opposite, screw-threaded end, said knob being adapted to exert pressure on a face of the other of said plates, and said plates are resiliently deformable such that, upon tightening of the clamp by rotation of said knob, said plates are deformed towards each other to clamp the arms of the seat member between them.

2. A retaining clamp as claimed in claim 1, wherein each said projection is annular and has an internal said complementary frusto-conical surface and said arms of said seat member are tubular and formed with external said frusto-conical surfaces.

3. A retaining clamp for a motor vehicle steering column which is adjustable longitudinally and angularly about a pivot axis transverse its longitudinal axis, wherein said clamp comprises:

a bracket adapted to be fixed to a vehicle body cross member and having means defining said pivot axis of said steering column;

a resilient seat member defining a seat for said steering column having an axis coaxial with said longitudinal axis of said steering column in use, said seat member having two arms extending substantially in the same direction transverse to said seat axis and engaged with said bracket for pivotal movement about said pivot axis; and a manually operable screw clamp for clamping said arms to said bracket and for simultaneously clamping said seat member against said steering column, in use, to retain it in said seat, said clamp being manually releasable to allow axial sliding movement of said steering column relative to said seat member and pivotal movement of said steering column with said seat member about said pivot axis, wherein said screw clamp has a screw-threaded shaft which defines said pivot axis, each of said arms of said seat member is formed with a frusto-conical surface and said bracket has two plates each having a complementary frusto-conical surface engaged with a respective frusto-conical surface on an arm, said arms being clamped between said bracket plates and said frusto-conical surfaces being wedged together on tightening of said clamping screw, said frusto-conical surfaces acting as bearing surfaces for pivoting of said seat member when said clamp is released, wherein:

each said plate defines an aperture;

said complementary frusto-conical surfaces comprise surfaces of respective bracket members each engaged in a said aperture in a plate and each defining a throughbore coaxial with said surface;

said screw-threaded shaft extends through said throughbores in said bracket members and has a head at one end which abuts an outer face of one of said members and a manually rotatable knob threaded onto its opposite screw-threaded end, said knob being adapted to exert pressure on the other of said members, said members being movable along the axis of the shaft to effect clamping and unclamping of the clamp on corresponding rotation of the knob.

4. A retaining clamp as in claim 3, wherein said bracket members comprise two frusta each having a substantially cylindrical end portion engaged in a cooperating aperture in a respective bracket plate, and wherein each said arm of the seat member is tubular and formed with an internal said frusto-conical surface which cooperates with a said complementary frusto-conical surface of a respective frustum.

5. A retaining clamp as in claim 4, wherein said manually operable knob has an annular flange surrounding said clamp shaft and a needle bearing is provided between said flange and a face of the adjacent frustum to exert pressure thereon on rotation of said knob to tighten the clamp.

6. A retaining clamp as in claim 5, wherein on rotation of said knob to loosen the clamp, said flange engages said adjacent frustum to force it away from the other frustum.

7. A retaining clamp as in any of claims 3 to 6, wherein resilient biasing means urge said frusta towards each other and stops are associated with said biasing means to limit the separation of the frusta.

8. A retaining clamp as in any of claims 3 to 7, wherein said clamp shaft is screw-threaded at each end, one end being engaged by said manually rotatable knob, and wherein the frustum remote from the knob defines a screw-threaded bore in which the other end of the shaft is engaged.

9. A retaining clamp as in claims 1 or 3, wherein stop means are provided for limiting the axial adjustment of the steering column.

* * * * *